United States Patent
Wang

(10) Patent No.: US 10,764,369 B2
(45) Date of Patent: Sep. 1, 2020

(54) DATA STORAGE METHOD AND SERVER APPLICABLE TO DISTRIBUTED SERVER CLUSTER

(71) Applicant: BEIJING BAIDU NETCOM SCIENCE AND TECHNOLOGY CO., LTD., Beijing (CN)

(72) Inventor: Tianyu Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 206 days.

(21) Appl. No.: 15/890,817

(22) Filed: Feb. 7, 2018

(65) Prior Publication Data
US 2018/0367610 A1    Dec. 20, 2018

(30) Foreign Application Priority Data

Jun. 19, 2017  (CN) .......................... 2017 1 0464719

(51) Int. Cl.
*H04L 29/08* (2006.01)

(52) U.S. Cl.
CPC ...... *H04L 67/1097* (2013.01); *H04L 67/1051* (2013.01); *H04L 67/1095* (2013.01)

(58) Field of Classification Search
CPC ......... H04L 12/40176; H04L 12/40202; H04L 29/08351; H04L 67/1051; H04L 67/1095; H04L 67/1097; G06F 11/2002; G06F 11/2053
See application file for complete search history.

(56) References Cited

U.S. PATENT DOCUMENTS

| | | | | |
|---|---|---|---|---|
| 8,838,539 B1* | 9/2014 | Ashcraft | ................. | H04L 67/02 707/637 |
| 9,984,140 B1* | 5/2018 | Sukumaran | ........... | G06F 16/219 |
| 10,432,721 B2* | 10/2019 | Vermeulen | .............. | H04L 67/42 |
| 2010/0262717 A1* | 10/2010 | Critchley | ............ | H04L 61/1541 709/251 |
| 2012/0124001 A1* | 5/2012 | Shah | ..................... | G06F 16/273 707/634 |
| 2012/0166390 A1* | 6/2012 | Merriman | ........... | G06F 16/2365 707/613 |
| 2012/0303791 A1* | 11/2012 | Calder | .................. | G06F 9/5083 709/224 |

(Continued)

FOREIGN PATENT DOCUMENTS

| | | |
|---|---|---|
| CN | 105426439 A | 3/2016 |
| CN | 105827678 A | 8/2016 |

*Primary Examiner* — Kamal B Divecha
*Assistant Examiner* — Sandarva Khanal
(74) *Attorney, Agent, or Firm* — Lathrop GPM LLP

(57) ABSTRACT

Data may be stored in a distributed server cluster which includes a plurality of nodes. A specific implementation of a method for storing data in the distributed server cluster comprises: receiving a data write request, the data write request comprising to-be-written data; broadcasting the data write request to each of groups in the server cluster, the each of the groups comprising at least one node, and at least one of the groups comprising at least two nodes; and sending a notification message of successful writing to a client sending the data write request, in response to receiving a confirmation message fed back from more than a half of the groups.

8 Claims, 5 Drawing Sheets

(56) References Cited

U.S. PATENT DOCUMENTS

| | | | |
|---|---|---|---|
| 2014/0101298 A1* | 4/2014 | Shukla | H04L 41/5006 |
| | | | 709/223 |
| 2016/0065663 A1 | 3/2016 | Yang et al. | |
| 2017/0235755 A1* | 8/2017 | Karampuri | G06F 16/1844 |
| | | | 707/620 |
| 2018/0048587 A1* | 2/2018 | Bai | H04L 67/1051 |
| 2018/0203607 A1* | 7/2018 | Chen | G06F 3/065 |
| 2018/0365106 A1* | 12/2018 | Huang | G06F 3/0635 |

* cited by examiner

DATA STORAGE METHOD AND SERVER APPLICABLE TO DISTRIBUTED SERVER CLUSTER

CROSS-REFERENCE TO RELATED APPLICATION

This application is related to and claims priority from Chinese Application No. 201710464719.4, filed on Jun. 19, 2017 and entitled "Data Storage Method and Server Applicable to Distributed Server Cluster", the entire disclosure of which is hereby incorporated by reference.

TECHNICAL FIELD

The present disclosure relates to the field of computer technology, particularly to the field of database technology, and more particularly to a data storage method and server applicable to a distributed server cluster.

BACKGROUND

With the rapid growth of Internet data, database as a storage medium for the Internet data bears increasingly more responsibility for data storage and data access. In a distributed data storage system, a given piece of data has multiple backups and is stored on different servers. Data consistency is an important indicator of Internet services. Data consistency, that is, multiple backups of the given data remain consistent.

In the data consistency protocol adopted in the existing distributed data storage schemas, data write is considered to be successful when data is written to more than a half of the servers. However, the server resource in the cluster is limited, and data consistency occupies considerable server resource, resulting in lower service availability, which is not conducive to efficient processing of service requests.

SUMMARY

To solve one or more technical problems mentioned in the above background section, embodiments of present disclosure provide a data storage method and server applicable to the data server cluster.

According to a first aspect, the embodiments of the present disclosure provide a data storage method applicable to the distributed server cluster, the server cluster including a plurality of nodes, and the method comprising: a master node in the server cluster receives a data write request, the data write request comprising a to-be-written data; the master node broadcasts the data write request to each of groups in the server cluster, the each of the groups including at least one node; the master node sends a notification message of successful writing to the client sending the data write request, in response to receiving a confirmation message fed back from more than a half of the groups; wherein, if the group does not comprise the master node, the group feeds back the confirmation message to the master node in response to at least one of the nodes in the group writing the to-be-written data to a memory successfully.

In some embodiments, if the group comprises the master node, the group feeds back a confirmation message to the master node in response to the master node writing the to-be-written data into the memory successfully.

In some embodiments, if the group comprises the master node and at least one slave node, the group feeds back the confirmation message to the master node in response to the master node and the at least one slave node in the group writing the to-be-written data to the memory successfully.

In some embodiments, the above method further comprises: one of the slave nodes in the server cluster as a candidate node issues an election request to each of the groups, in response to a number of the groups feeding back the confirmation message to the master node being less than a half, or none of the nodes in each of more than a half of the groups receiving a heartbeat message broadcasted by the master node within a preset time; the candidate node is switched as a new master node, in response to the candidate node receiving an agree message from each node in the each of more than a half of the groups.

In some embodiments, the above method further comprises: dividing a plurality of nodes in the server cluster into a plurality of groups according to a deployed physical location of each of the nodes.

In some embodiments, the above method further comprises: the master node sends a data synchronization confirmation message to the each of the groups feeding back the confirmation message, in response to receiving the confirmation message fed back from more than a half of the groups.

According to a second aspect, the embodiments of the present disclosure provide a data storage server applicable to a distributed data server cluster, including: a receiving unit, configured to receive a data write request, the data write request comprising the to-be-written data; a broadcasting unit, configured to broadcast the data write request to the each of the groups in the server cluster, the each of the groups including at least one node, and at least one of the groups including at least two nodes; a sending unit, configured to send a notification message of successful writing to a client sending the data write request, in response to receiving a confirmation message fed back from more than a half of the groups; wherein, if a group does not comprise the master node in the server cluster, the group feeds back the confirmation message to the master node, in response to at least one node in the group writing the to-be-written data to a memory successfully.

In some embodiments, the above server further includes: a requesting unit, as a candidate node, configured to issue an election request to the each of the groups, in response to a number of the groups feeding back the confirmation message to the master node being less than a half, or none of the nodes in each of more than a half of the groups receiving a heartbeat message broadcasted by the master node within a preset time; and a switching unit, configured to be switched as a new master node, in response to the candidate node receiving an agree message from each node in the each of more than a half of the groups.

In some embodiments, the above server further includes: a confirmation unit, configured to send a data synchronization confirmation message to the each of the groups feeding back the confirmation message in response to receiving the confirmation message fed back from more than a half of the groups.

The present disclosure provides a data storage method and server applicable to the data server cluster: the master node in the server cluster receives the data write request; then the master node broadcasts the data write request to each of the groups in the server cluster, wherein each of the groups includes at least one node. When the master node receives a confirmation message fed back from more than a half of the groups, the master node sends a notification message of successful writing to the client sending the data write request; wherein, if the group does not include the master node, then the group feeds back a confirmation message to the master node after at least one of the nodes in the group has written the to-be-written data successfully, leading to decreases of the number of nodes required to ensure the data consistency, and further improves the service availability at the same time ensuring the data consistency.

BRIEF DESCRIPTION OF THE DRAWINGS

Other features, objects, and advantages of the present disclosure will become more apparent by reading the following detailed description of non-limiting embodiments with reference to the accompanying drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
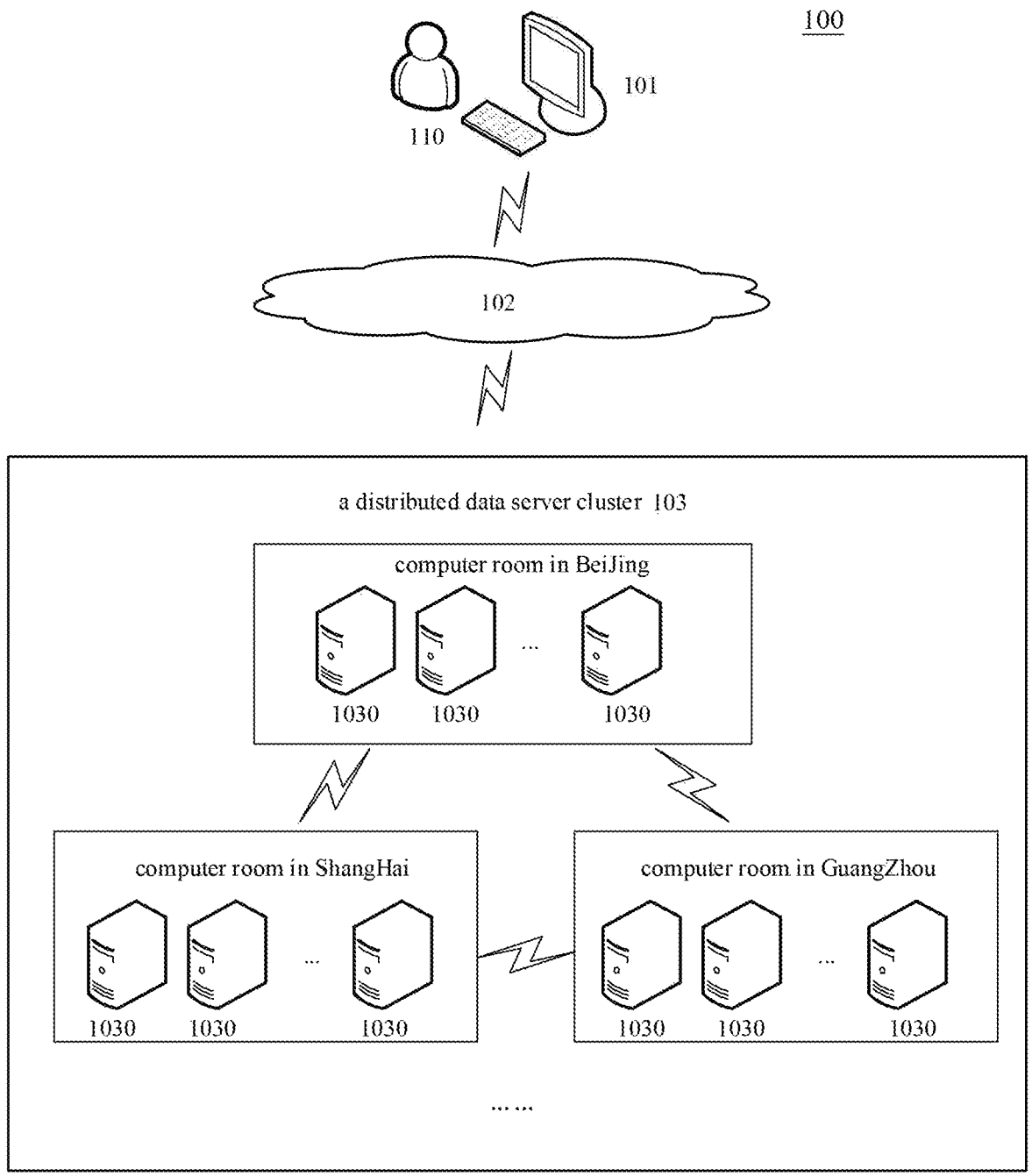
FIG. 1 is an exemplary system architecture to which the method of the present disclosure may be applicable.

FIG. 1 shows an exemplary architecture of a system 100 which may be used by a data storage method according to the embodiments of the present disclosure.

As shown in FIG. 1, the system architecture 100 may include client 101, a network 102 and a distributed data server cluster 103. The network 102 serves as a medium providing a communication link between the client 101 and the server cluster 103 and between servers at different locations of the server cluster 103. The network 102 may include various types of connections, such as wired or wireless transmission links, or optical fibers.

The user 110 may write data to or request to read data from the distributed data server cluster 103 through the client 101. The client 101 may be configured in a terminal device, such as a computer with a display screen. The user 110 inputs a data read/write request through an input interface of the terminal device, and the terminal device sends the data read/write request to the distributed data server cluster 103.

Comprising a plurality of servers 1030, the distributed data server cluster 103 may be a server cluster that provides data services for applications of the client 101, or, may be a server cluster that provides a data server for an online service. The plurality of servers 1030 in the server cluster 103 may be in data centers located in different geographical locations, for example, the servers 1030 in the server cluster 103 in FIG. 1 may be located in a Beijing computer room, a Shanghai computer room and a Guangzhou computer room, respectively. Each of the servers 1030 may be connected to each other through a network. The server cluster 103 may receive a data read/write request sent by the user 110 through the client 101 and perform procession on the data read/write request, for example, may update the data wrote by the user to multiple servers, and then return a message of successful data write to the client.

It should be noted that, the data storage method applicable to the data server cluster provided by the embodiment of the present disclosure is generally executed by the server cluster 103, and the data storage server applicable to the data server cluster is generally disposed in the server cluster.

It should be understood that, the number of the clients, networks, and servers in the server cluster in FIG. 1 is merely illustrative. Depending on implementation requirements, there can be any number of the clients, the networks and the servers.

Figure 2:
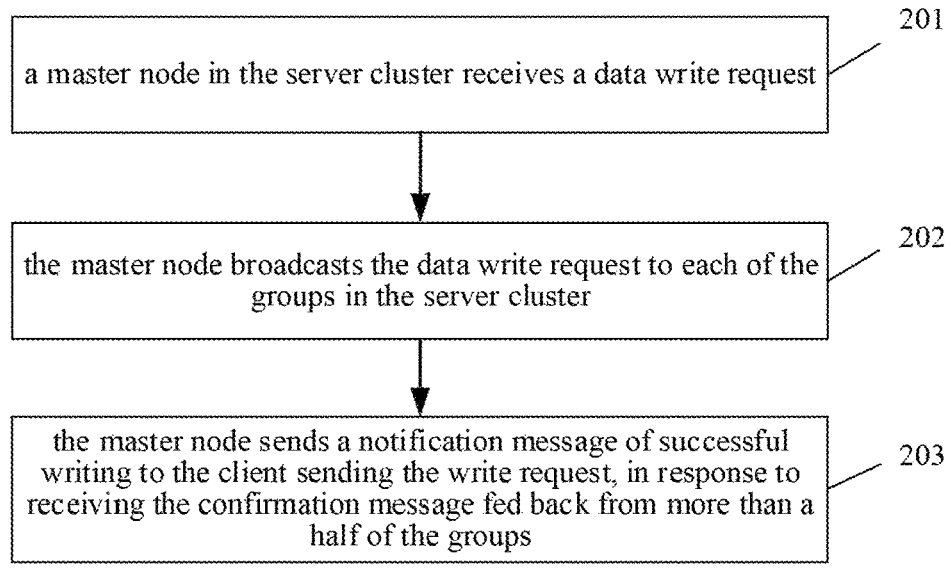
FIG. 2 is a flowchart of one embodiment of the data storage method applicable to a data server cluster according to the present disclosure.

Further referring to FIG. 2, which shows a flowchart of one embodiment of the data storage method applicable to a data server cluster according to the present disclosure. Here, the data server cluster includes a plurality of nodes, and each of the nodes may be a server. The data storage method applicable to the data server cluster comprises following steps.

At step 201, a master node in the server cluster receives a data write request.

In the present embodiment, the data server cluster may adopt a distributed storage schema, each of the nodes is deployed in different geographical locations, one master node and a plurality of slave nodes are included therein. The master node can handle all of the client-side interactions, synchronize the data wrote by the client to the slave node, and read the data requested by the client from the slave nodes. The slave nodes can receive a log synchronization message or a heartbeat message sent by the master node, perform operations such as log synchronization and data reading, and return a response message to the master node. Generally, there is one master node and a plurality of slave nodes included in one server cluster.

The master node can receive a data write request sent by the client. The data write request comprises a to-be-written data. Optionally, the data write request may further include a user identifier of the client, an equipment identifier of the client, a request time and the like, the user identifier and the equipment identifier may be used to discriminate and verify the client permissions before writing the data.

In an actual service scenario, the data write request may be, for example, a request for entering user information, including a request for changing a user name or password. The entry of the user information may be executed by the user on the client and is sent by the client equipment to the master node in the server cluster. The master node can receive the request through the network.

At step 202, the master node broadcasts the data write request to each of the groups in the server cluster.

In order to ensure that data services are provided normally when an equipment fault or a network fault occurs to some nodes in the server cluster, the master node needs to synchronize the to-be-written data to some slave nodes, to ensure the services availability. At the same time, all backups of a given data in the server cluster need to be modified to the latest data values, to avoid data consistency issues.

In the present embodiment, the master node may broadcast the received data write request to each of the groups in the server cluster. Specifically, after receiving the data write request, the master node may send a broadcast message, to notify the groups which have established data communications with the master node to write the data. Each of the groups includes at least one node, the group in which the master node is located may only include the master node or may include the master node and at least one slave node, the other groups may include one or more slave nodes, and at least one of the groups includes at least two nodes.

In the present embodiment, the master node can establish and maintain data communications with more than a half of the groups in the server cluster. Further, the master node can establish and maintain data communication with each of the groups according to a configured data consistency protocol. In the data consistency protocol, if the master node has established data communication with at least one of the slave nodes in each of more than a half of the groups, then it is considered that the server cluster can meet data consistency requirements. The master node can periodically send a heartbeat message to a slave node in the group that established a data communication with the master node, after receiving the heartbeat message the slave node returns a response message to the master node, after the master node receives the response message, the data communication between the group in which the slave node is located and the master node is determined to be normal.

The master node may broadcast the data write request to each of the groups that maintain data communication with the master node, that is, broadcast the data write request to each of the slave nodes that respectively belong to more than a half of the groups and maintain data communication with the master node. If at least one of the slave nodes in a group has received the data write request, it may be determined that the group has received the data write request.

At step 203, in response to receiving the confirmation message fed back from more than a half of the groups, the master node sends a notification message of successful writing to the client sending the write request.

After receiving the data write request broadcasted by the master node, the each of the slave nodes that maintain data communications with the master node may write the to-be-written data in the data write request into a memory and then return a confirmation message of successful writing to the master node, then it can be determined that the group in which the slave node is located has fed back a confirmation message to the master node, that is, it can be determined that the group in which the slave node is located has been written successfully. The confirmation message here may be a message confirming that data has been written successfully.

Specifically, when the master node is not included in a group, the group feeds back a confirmation message to the master node in response to at least one of the nodes in the group successfully writing the to-be-written data to the memory. That is, for other groups other than the group including the master node, if at least one of the slave nodes in the group has successfully written the to-be-written data to the memory and has sent a confirmation message of successful writing, it is considered that the group has been successfully written with the data, or that the group has completed the data synchronization. After more than a half of the groups have been successfully written with the data or have completed the data synchronizations, it can be determined that the server cluster has been successfully written with the data and has achieved the data consistency, and that when the node fault occurs the data would not be lost, then, the master node can send the notification message of successful writing to the client sending the data write request.

In some optional implementations of the present embodiment, if the number of the groups feeding back the confirmation message to the master node does not exceed a half, it can be determined that abnormal situations have occurred to the master node, the slave node, or the network. In this case, the master node may send a notification message of failed write to the client sending the data write request.

For the group including the master node, it may be defaulted that the group has been successfully written with the data, that is, it may be determined that the group has fed back a confirmation message to the master node.

In some optional implementations of the present embodiment, if a group includes the master node, the group may feedback a confirmation message to the master node in response to the master node successfully writing the to-be-written data to the memory. In other words, the group in which the master node is located after the master node has successful written the to-be-written data into the memory of the master node, then the group in which the master node is located is written successfully. A parameter returned after the data is written into the memory of the master node may be monitored by the master node, the parameter serves as the above-mentioned feedback confirmation message. After the parameter is detected, it is determined that the group in which the master node is located has been written successfully.

In some other optional implementations of the present embodiment, if a group includes the master node, the group may feedback a confirmation message to the master node in response to the master node and at least one of the slave nodes in the group successfully writing the to-be-written data into the memory. In other words, when the group in which the master node is located further includes at least one slave node, after the master node and the at least one slave node have successfully written the to-be-written data into the memory, then the group in which the master node is located is written successfully. Similarly, a parameter, returned after the data is written into the memory of the master node, can be monitored by the master node, the parameter serves as the above-mentioned fed-back confirmation message. After one of the slave nodes in the same group also has successfully written the to-be-written data into the memory and has fed back with a confirmation message, that the group in which the master node is located has been written successfully is determined. Therefore, at least one of the slave nodes in the group in which the master node is located is added as a data synchronization node, so that the data consistency of the data server cluster can be enhanced.

In the above embodiment, after more than a half of the groups are successfully written, it may be determined that the data server cluster has successfully completed the writing of the to-be-written data. Then, the master node may send a notification message to the client sending the data write request, to inform the client that the data write request has been processed and successfully written. The client may receive the notification message and present it to the user.

Through the steps: a master node in a server cluster receives a data write request; and then the master node broadcasts the data write request to each of the groups in the server cluster, and sends a notification message to the client sending a data write request in response to receiving the confirmation message fed back by more than a half of the groups; there, in response to at least one of the nodes in the group writing the to-be-written data into the memory, the groups without the master node included feed back the above confirmation message to the master node, and, at least one of the groups includes at least two nodes, and by utilizing the method of data consistency among groups, may ensure that at least one of the nodes in each group has been written with the to-be-written data. The data storage method applicable to a distributed server cluster provided in the above embodiments of the present disclosure, compared with the traditional distributed data storage method which needs to synchronize the to-be-written data to more than a half of nodes, reduces the number of the nodes needs to be synchronized with the data, increases the allowed number of faulty nodes, thereby improves the service availability.

In some optional implementations of the present embodiment, the above method may further includes: dividing a plurality of nodes in the server cluster into multiple groups, according to a deployed physical location of each of the nodes. For example, as shown in the schema of FIG. 1, dividing according to the computer room in which each of the nodes located, the nodes in one computer room belonging to one group.

Further, the number of the nodes in a single group is less than a half of the total number of the nodes in the server cluster, therefore, the cases that data is inconsistent or service is unavailable can be avoided when fault occurs to the single computer room.

In some optional implementations of the present embodiment, the above data storage method may further includes: the master node sends a data synchronization confirmation message to each of the groups feeding back the confirmation message in response to receiving the confirmation message fed back from more than a half of the groups. In other words, after receiving the confirmation message fed back from more than a half of the groups, the master node may send the data synchronization confirmation message to each of the groups feeding back the confirmation message. Specifically, the master node may send the data synchronization confirmation message to the slave nodes feeding back the confirmation message in each group, to complete the confirmation of the data synchronization.

According to the data storage method provided in the above embodiment, the data server cluster performs data storage according to the following group-based data consistency protocol: the master node needs to maintain data communications with more than a half of the groups, and when at least one of the nodes in a group maintains data communication with the master node, it is considered that this group has maintained the data communication with the master node.

Figure 3:
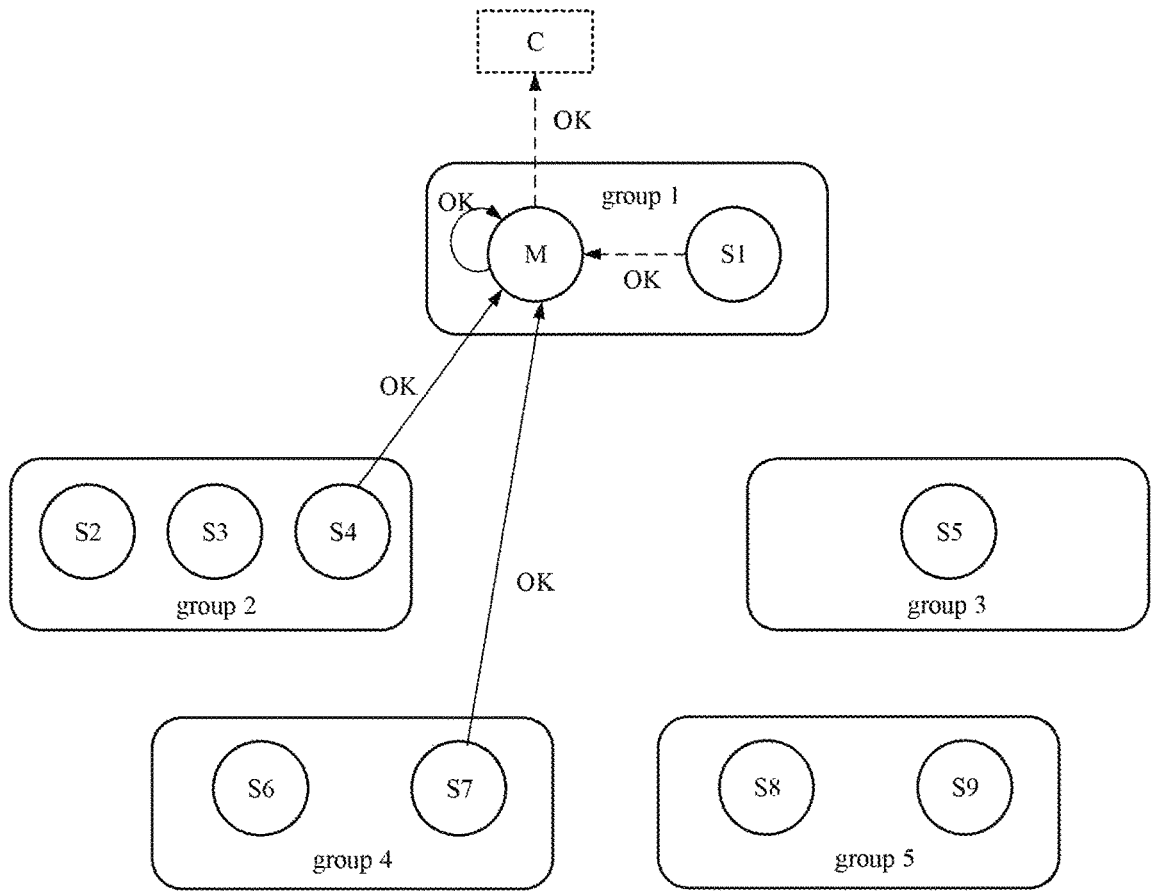
FIG. 3 is a schematic diagram of the principle of the specific embodiment, as shown in FIG. 2, of the data storage method applicable to a data server cluster.

Referring to FIG. 3, which shows a schematic diagram of the principle of the specific embodiment, as shown in FIG. 2, of the data storage method applicable to a data server cluster, which also shows a schematic diagram of an application scenario of the data storage of the above group-based data consistency protocol of a server cluster.

As shown in FIG. 3, the data server cluster includes total five groups: group 1, group 2, group 3, group 4, and group 5, and each of the groups can be located in different computer rooms. The group 1 includes the master node M and one slave node S1, the group 2 includes three slave nodes S2, S3 and S4, the group 3 includes one slave node S5, the group 4 includes two slave nodes S6 and S7, and the group 5 includes two slave nodes S8 and S9. The master node M maintains data communication with the slave node S4 in the group 2 and the slave node S7 in group 4. When data is written, the master node M receives a confirmation message "OK" fed back from the master node M of the group 1, the slave node S4 in the group 2 and the slave node S7 in the group 4, and then, may send a notification message "OK" of successful writing to client C. Or, the master node M receives the confirmation message "OK" fed back from the master node M and the slave node S1 in the group 1, the slave node S4 in the group 2 and the slave node S7 in the group 4, and then, the master node M may send a notification message "OK" of successful writing. Here, the master node M maintains data communication with the group 1, the group 2 and the group 4, so as to ensure that the data of the master node M may be backed up across the computer rooms in real time, and the data of the service will not be lost and remains consistent among multiple nodes.

It can be seen from FIG. 3 that in the application scenario of the present embodiment, the number of the nodes that maintain communication with the master node is less than a half of the total number of the nodes in the server cluster. When fault occurs to some nodes in the server cluster, fewer nodes are utilized to ensure the data consistency and thus to avoid the cases that the service availability is greatly affected.

Figure 4:
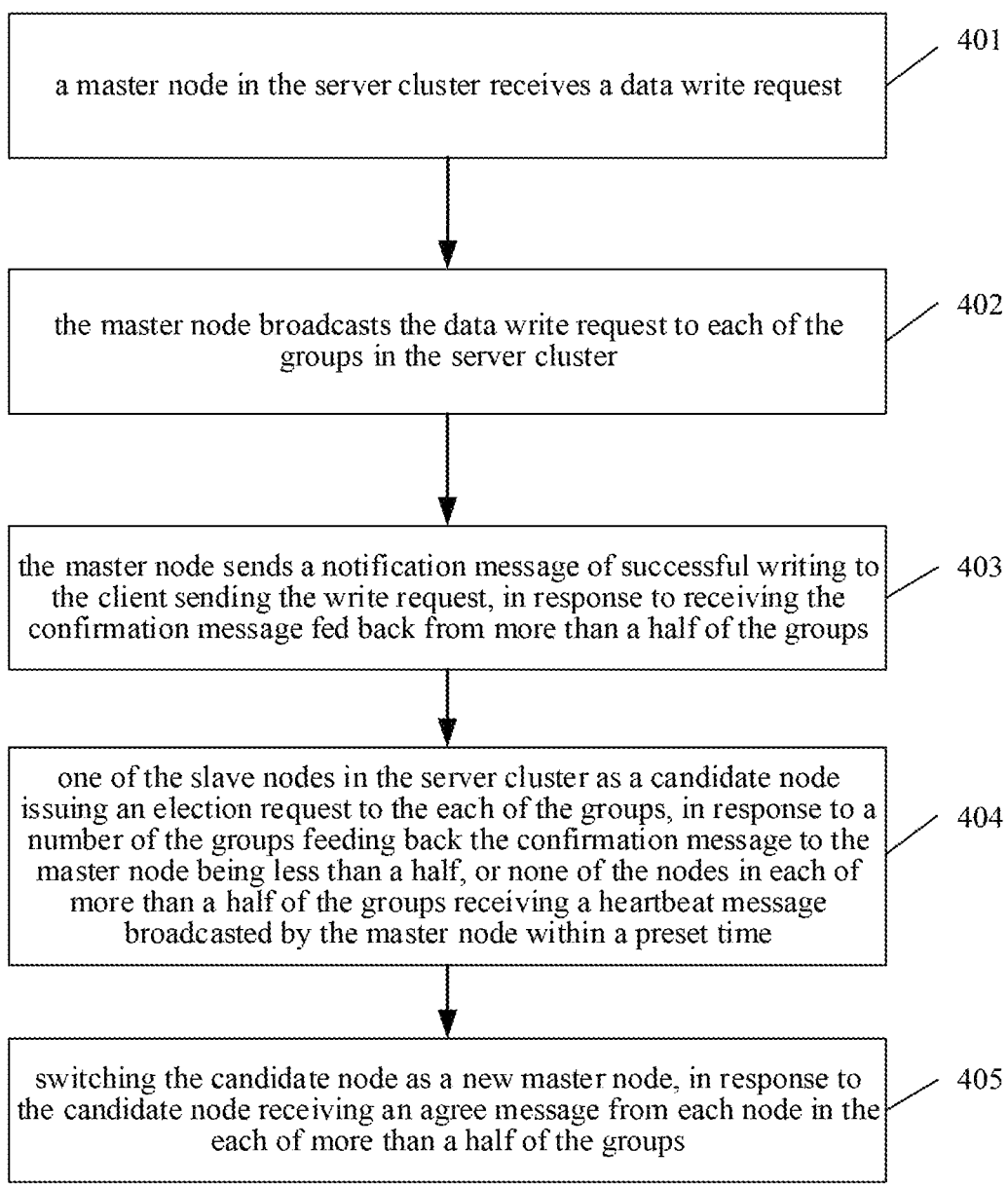
FIG. 4 is a flowchart of the data storage method applicable to a data server cluster according another embodiment of to the present disclosure.

Referring to FIG. 4, which shows a flowchart of the data storage method applicable to a data server cluster according to another embodiment of the present disclosure, the data storage method applicable to the data server cluster comprises following steps.

At step 401, the master node in the server cluster receives a data write request.

In the present embodiment, the data server cluster may adopt a distributed storage schema, each of the nodes is deployed in different geographical locations, and one master node and a plurality of slave nodes are included therein. The master node may receive a data write request sent by a client. The data write request includes to-be-written data. Optionally, the data write request may further comprises a user identifier of the client, an equipment identifier of the client, a request time and the like, the user identifier and the equipment identifier may be used to discriminate and verify the client permissions before writing the data.

At step 402, the master node broadcasts the data write request to each of the groups in the server cluster.

In the present embodiment, after receiving the data write request, the master node broadcasts this data write request in the server cluster and requests the other nodes to back up the to-be-written data. The groups which have established data communications with the master node may receive this data write request. Here, each of the groups includes at least one node, the group in which the master node is located may only include the master node or may include the master node and at least one slave node, the other groups may include one or more slave nodes, and at least one of the groups includes at least two nodes.

In the present embodiment, the master node may establish and maintain data communications with more than a half of the groups in the server cluster. Further, the master node may establish and maintain data communication with each of the groups according to a configured data consistency protocol. In the data consistency protocol, if the master node has established data communication with at least one of the slave nodes in each of more than a half of the groups, then it may be considered that the server cluster meet data consistency requirements.

At step 403, the master node sends a notification message of successful writing to the client sending the data write request, in response to receiving a confirmation message fed back from more than a half of the groups.

After receiving the data write request broadcasted by the master node, each of the slave nodes that maintains data communication with the master node may write the to-be-written data in the data write request into a memory and then returns a confirmation message of successful writing to the master node, then it can be determined that the group in which the slave node is located has fed back the confirmation message to the master node, that is, it can be determined that the group in which the slave node is located has been written successfully.

When the master node is not included in a group, the group feeds back a confirmation message to the master node in response to at least one of the nodes in the group successfully writing the to-be-written data to the memory. That is, for other groups other than the group including the master node, if at least one of the slave nodes in the group has successfully written the to-be-written data to the memory and has sent a confirmation message of successful writing, it is considered that the group has been successfully written with the data, or that the group has completed the backup of the data. Then, the master node may send a notification message of successful writing to the client sending the data write request.

If a group includes the master node: in some optional implementations, the group may feedback a confirmation message to the master node in response to the master node and at least one of the slave nodes in the group successfully writing the to-be-written data into the memory; in some other optional implementations, the group may feedback a confirmation message to the master node in response to the master node successfully writing the to-be-written data to the memory. In other words, the group in which the master node is located may feedback with a confirmation message after the master node has written the data successfully, may feed back a confirmation message after the master node and at least one of the slave nodes have written the data successfully.

In some optional implementations of the present embodiment, if the number of the groups feeding back the confirmation message to the master node does not exceed a half, it may be determined that abnormal situations have occurred to the master node, the slave node or the network. In this case, the master node may send a notification message of failed write to the client sending the data write request.

At step 404, a slave node in the server cluster as a candidate node issues an election request to each of the groups, in response to the number of the groups feeding back the confirmation message to the master node being less than a half, or that none of the nodes in each of more than a half groups receive the heartbeat message broadcasted by the master node within a preset time.

In the present embodiment, when the number of the groups feeding back the confirmation message to the master node is less than a half, or that none of the nodes in each of more than a half groups receive the heartbeat message broadcasted by the master node within a preset time, it can be determined that the number of the groups maintaining communication with the master node is less than a half, then, to ensure the data consistency, a slave node in the server cluster becomes the candidate node and issues an election request to each of the groups.

According to one aspect, specifically, if the number of the groups feeding back a confirmation message to the master node does not exceed a half, then it is determined that the number of the groups maintaining data communication with the mater node does not exceed a half, and the backup and the consistency of the data cannot be ensured, and then the other slave nodes may issue an election request.

According to another aspect, the data communications between the master node and the slave nodes of each of the groups are maintained through the heartbeat message sent by the master node. Each of the slave node is configured with a clock which issues the election, within a preset time of the clock the slave node would not issue the election request. After receiving the heartbeat message sent by the master node, the clock of the slave node is reset and timing is restarted. If the slave node does not receive the heartbeat message sent by the master node within a preset time, then the slave node is triggered to issue an election request to the other nodes.

At step 405, the candidate node is switched as a new master node, in response to the candidate node receiving the agree message fed back from each node in each of more than a half of the groups.

The moment a slave node issues the election request the slave node becomes the candidate node. In the present embodiment, the other nodes in the server cluster may send an agree message or a rejection message to the candidate node after receiving the election request. If the candidate node receives the agree message from each node in the each of more than a half groups, then the candidate node is switched as the master node and the original master node is switched as a slave node. In other words, if each node in more than a half of the groups votes for the candidate node, the candidate node becomes the new master node.

According to the above data storage method 400, the data server cluster elects the master node based on following group-based consistency protocol: if a node receives the a vote from each node of more than a half of the groups, the node becomes the new master node.

The step 401, step 402 and step 403 in the above method flowchart is identical with the step 201, the step 202 and the step 205 in the above described embodiments, the above descriptions on the step 201, the step 202 and the step 205 also apply to the step 401, step 402 and step 403 in the present embodiment and will not be repeated here.

It can be seen that, based on the embodiment shown in FIG. 2, the embodiment shown in FIG. 4 adds the strategy of electing a new master node when fault occurs to the master node or the network, that is, after one of the nodes becomes a candidate node and gains a vote from each node in each of the most of the groups, the candidate node is switched as a new master node. Therefore, when abnormal situations in the equipment or the network caused the data communication between the master node and the group disconnected, the data storage method 400 applicable to the distributed server cluster of the present embodiment may switch the master node in time, to ensure the reliability of the data backup.

Figure 5:
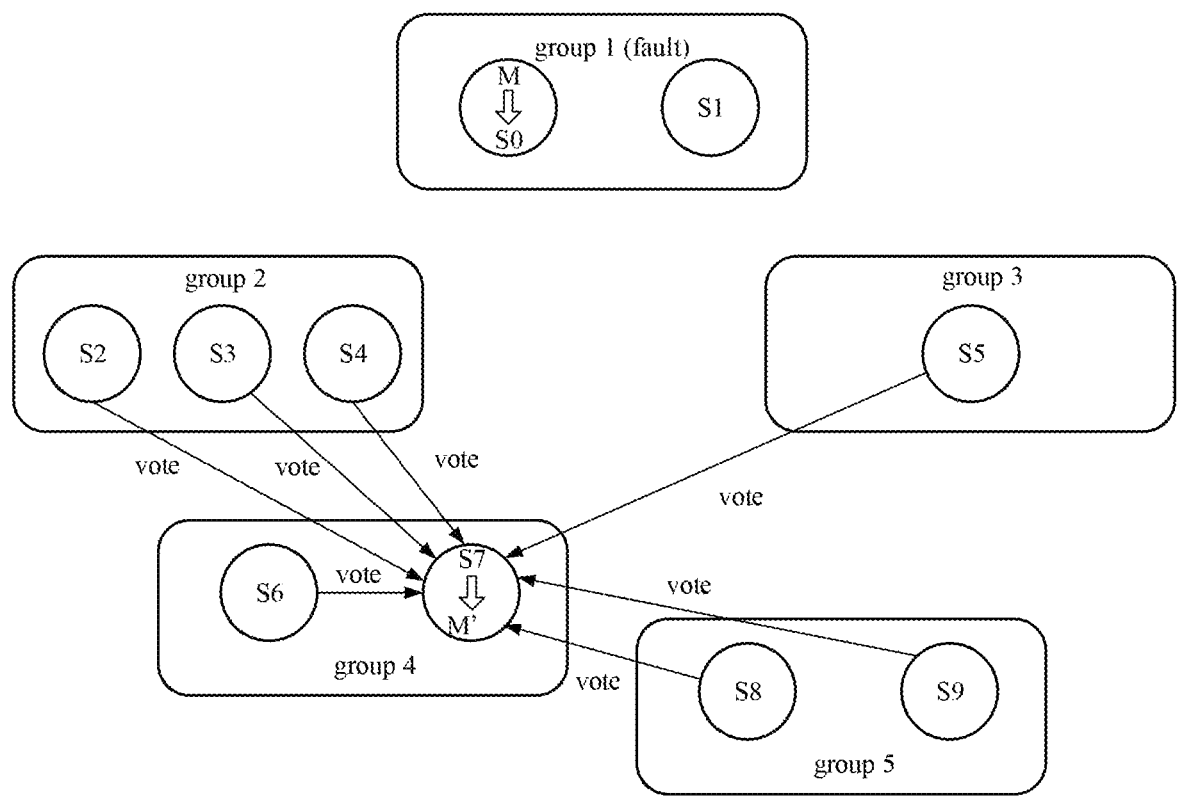
FIG. 5 is a schematic diagram of the principle of the specific embodiment, as shown in FIG. 3, of the data storage method applicable to a data server cluster.

Referring to FIG. 5, which shows the schematic diagram of the principle of the specific embodiment, as shown in FIG. 3, of the data storage method applicable to a data server cluster, which also shows the schematic diagram of a master election application scenario of the data storage of the above group-based data consistency protocol of a server cluster.

As shown in FIG. 5, the distributed data server cluster includes nine nodes: M(S0), S1, S2, S3, S4, S5, S6, S7(M'), S8, and S9, the nodes are divided into five groups, wherein the group 1 includes nodes M and S1, the group 2 includes nodes S2, S3 and S4, the group 3 includes nodes S5, the group 4 includes nodes S6 and S7, and group 5 includes nodes S8 and S9. When fault occurs to the group 1 (for example, an abnormal situation occurs to the network of the computer room corresponding to the group 1), the master node M cannot maintain the data communication with more than a half of the groups in the server cluster. Then the node S7 may issue an election and send the election request to the other node S6 in the same group, as well as the other groups. After each node in each of more than a half of the groups, including the node S7, confirms the vote for the node S7, the node S7 is switched as the new master node. For example, in FIG. 5, all the nodes in the total four groups, which are the group 2, the group 3, the group 5 and the group in which the node S7 located, confirm the votes for the node S7, by now the number of the groups, all nodes in which have voted, exceeds a half, then the node S7 is switched as the master node M'.

Figure 6:
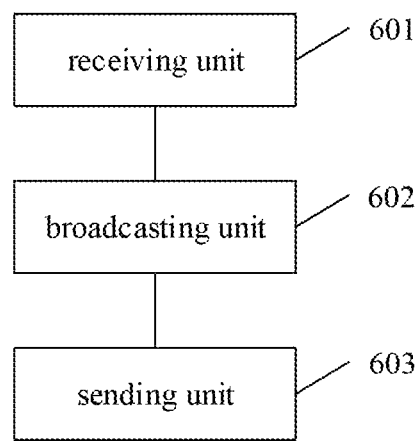
FIG. 6 is a structural schematic diagram of one embodiment of a data storage server applicable to a data server cluster.

Further referring to FIG. 6, as an implementation of the method shown in the above figures, the present disclosure provides an embodiment applicable to the data storage sever in the distributed sever cluster.

As shown in FIG. 6, the data storage server 600 applicable to a distributed server cluster of the present embodiment includes: a receiving unit 601, a broadcasting unit 602 and a sending unit 603. Here, the receiving unit 601 is used for receiving a data write request, the data write request comprising to-be-written data; the broadcasting unit 602 is used for broadcasting the data write request to each of the groups in the server cluster, the each of the groups including at least one node, and at least one of the groups including at least two nodes; the sending unit 603 is used for sending a notification message of successful writing to a client sending the data write request, in response to receiving a confirmation message fed back from more than a half of the groups; wherein, if the group does not include a master node in the server cluster, the group feeds back the confirmation message to the master node, in response to at least one of the nodes in the group writing the to-be-written data to a memory successfully.

In the present embodiment, when the above server 600 is the master node in the server cluster, the receiving unit 601 may receive the data write request from a client, the data write request may include a user identifier, an equipment identifier of the client, a request time and the like, other than the to-be-written data. The broadcasting unit 602 may broadcast the data write request received from the receiving unit 601 to each of the groups in the server cluster, to notify each of the groups to back up the data. The server in the groups in communication connection with a master server may receive he message broadcasted by the broadcasting unit 602. When at least one of the nodes in each of the groups in more than a half of the groups has fed back with the confirmation message, the sending unit 603 may determine that the data has been written into more than a half of the groups, then, a notification message may be sent to the client, to notify the client that the data has been successfully written.

In some embodiments, if a group includes the master node, the group in which the master node is located feeds back a confirmation message to the master node in response to the master node writing the to-be-written data into the memory successfully. In some other embodiments, if a group includes the master node and at least one slave node, the group in which the master node is located feeds back a confirmation message to the master node in response to the master node and at least one of the slave nodes in the group writing the to-be-written data into the memory successfully.

In some embodiment, the above server 600 may further include: a requesting unit and a switching unit. When a server is a slave node in the server cluster, the requesting unit as a candidate node issues an election request to each of the groups, in response to a number of the groups feeding back the confirmation message to the master node being less than a half, or none of the nodes in each of more than a half of the groups receiving a heartbeat message broadcasted by the master node within a preset time; the switching unit is configured to be switched as a new master node, in response to the candidate node receiving an agree message from each node in the each of more than a half of the groups.

In some embodiments, the above server may further include a confirmation unit, configured to send a data synchronization confirmation message to the each of the groups feeding back the confirmation message in response to receiving the confirmation message fed back from more than a half of the groups.

It should be understood that, the units recorded in the server 600 is corresponding to each of the steps of the method described with reference to the FIG. 2 and FIG. 4. Therefore, the above described operations and characteristics on the method is also adapted to the server 600 as well as the units included therein, which will not be repeated here.

The storage server 600 applicable to the distributed data server cluster and provided in the embodiments of the present disclosure, as the master node in the server cluster, may receive the data write request sent form the client, broadcast the data write request to multiple groups in the server cluster, and send a notification message of successful writing to the client when receiving the confirmation message fed back from at least one of the nodes in more than a half groups, which may decrease the number of nodes required to ensure the data consistency, and further improve the service availability with the data consistency.

Figure 7:
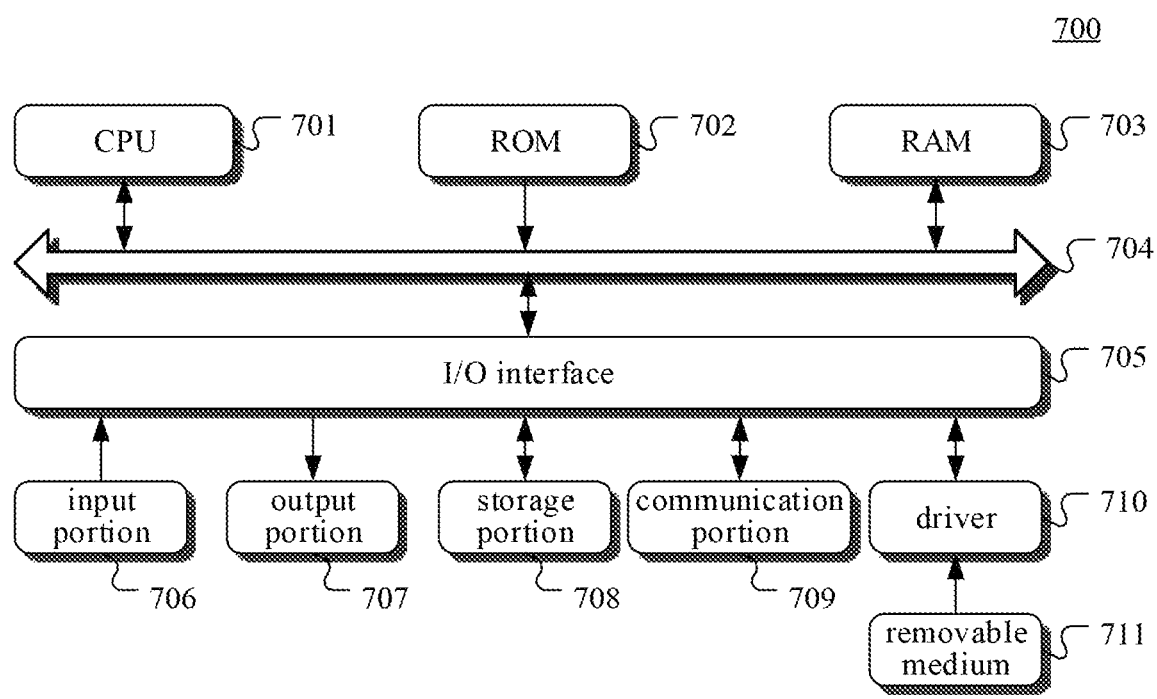
FIG. 7 is a structural schematic diagram of a computer system adapted to implement a server in a distributed server cluster according to the embodiments of the present disclosure.

Further referring to FIG. 7, which shows a structural schematic diagram of a computer system adapted to implement a server in a distributed server cluster according to an embodiment of the present disclosure. The server shown in FIG. 7 is merely an example and should not bring any limitation to the function and usage range of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion X09, and/or may be installed from the removable media X11. The computer program, when executed by the central processing unit (CPU) X01, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a receiving unit, a broadcasting unit and a sending unit, where the names of these units or modules do not in some cases constitute a limitation to such units or modules themselves. For example, the receiving unit may also be described as "a unit for receiving a data write request."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: receive a data write request, the data write request comprising the to-be-written data; broadcast the data write request to each of the groups in the server cluster, the each of the groups comprising at least one node, and at least one of the groups comprising at least two nodes; and send a notification message of successful writing to a client sending the data write request, in response to receiving a confirmation message fed back from more than a half of the groups; wherein, if the group does not comprise a master node in the server cluster, the group feeds back the confirmation message to the master node, in response to at least one of the nodes in the group writing the to-be-written data to a memory successfully.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A data storage method applicable to a distributed server cluster, the distributed server cluster comprising a plurality of nodes, including a master node and a plurality of slave nodes, and the method comprising:

forming a plurality of groups according to a deployed physical location of each of the plurality of nodes that are included in the distributed server cluster such that nodes of the plurality of nodes deployed in a same physical location belong to a same group, wherein the plurality of groups comprises a first group comprising at least said master node, a plurality of second groups each comprising at least two slave nodes but not comprising said master node, and a third group comprising at least one slave node but not comprising said master node;

receiving, by the master node in the distributed server cluster, a data write request, the data write request comprising to-be-written data;

broadcasting, by the master node, the data write request to each of the plurality of groups in the distributed server cluster; and sending, by the master node, a notification message of successful writing to a client sending the data write request, in response to receiving confirmation messages of successfully writing the to-be-written data in memory fed back from more than a half of the plurality of groups;

wherein, for the first group comprising the master node, the group feeds back the confirmation message to the master node in response to the master node writing the to-be-written data to a memory successfully;

wherein, each of the plurality of second groups not comprising said master node and the third group not comprising said master node feeds back the confirmation message to the master node in response to at least one node in respective group writing the to-be-written data to a memory successfully.

2. The data storage method according to claim 1, wherein, for a group comprising the master node and at least one slave node, the group feeds back the confirmation message to the master node in response to the master node and at least one of the at least one slave node in the group writing the to-be-written data to the memory successfully.

3. The data storage method according to claim 1, further comprising:
issuing, by one of the plurality of slave nodes in the distributed server cluster as a candidate node, an election request to each of the plurality of groups, in response to a number of the plurality of groups feeding back the confirmation message to the master node being less than a half, or none of the plurality of slave nodes in each of more than a half of the plurality of groups receiving a heartbeat message broadcasted by the master node within a preset time; and
switching the candidate node as a new master node, in response to the candidate node receiving an agree message from each of the plurality of slave nodes in the each of more than a half of the plurality of groups.

4. The data storage method according to claim 1, further comprising: sending, by the master node, a data synchronization confirmation message to the each of the plurality of groups feeding back the confirmation message, in response to receiving the confirmation message fed back from more than a half of the plurality of groups.

5. A data storage server applicable to a distributed server cluster comprising a plurality of nodes, including a master node and a plurality of slave nodes, comprising:
at least one processor; and
a memory storing instructions, which when executed by the at least one processor, cause the at least one processor to perform operations, the operations comprising:
forming a plurality of groups according to a deployed physical location of each of the plurality of nodes that are included in the distributed server cluster such that nodes of the plurality of nodes deployed in a same physical location belong to a same group, wherein the plurality of groups comprises a first group comprising at least said master node, a plurality of second groups each comprising at least two slave nodes but not comprising said master node, and a third group comprising at least one slave node but not comprising said master node;

receiving a data write request, the data write request comprising to-be-written data;

broadcasting the data write request to each of the plurality of groups in the distributed server cluster; and sending a notification message of successful writing to a client sending the data write request, in response to receiving confirmation messages of successfully writing the to-be-written data in memory fed back from more than a half of the plurality of groups;

wherein, for the first group comprising the master node, the group feeds back the confirmation message to the master node in response to the master node writing the to-be-written data to a memory successfully;

wherein, each of the plurality of second groups not comprising said master node and the third group not comprising a master node in the distributed server cluster feeds back the confirmation message to the master node in response to at least one node in respective group writing the to-be-written data to a memory successfully.

6. The data storage server according to claim 5, wherein the operations further comprise:
issuing, by one of the plurality of slave nodes in the distributed server cluster as a candidate node, an election request to each of the plurality of groups, in response to a number of the plurality of groups feeding back the confirmation message to the master node being less than a half, or none of the plurality of slave nodes in each of more than a half of the plurality of groups receiving a heartbeat message broadcasted by the master node within a preset time; and
switching the candidate node as a new master node, in response to the candidate node receiving an agree message from each of the plurality of slave nodes in the each of more than a half of the plurality of groups.

7. The data storage server according to claim 5, wherein the operations further comprise:
sending a data synchronization confirmation message to the each of the plurality of groups feeding back the confirmation message, in response to receiving the confirmation message fed back from more than a half of the plurality of groups.

8. A non-transitory computer-readable storage medium, storing a computer program thereon, wherein the program, when executed by a processor, causes the processor to perform operations, the operations comprising:
forming a plurality of groups according to a deployed physical location of each of a plurality of nodes including a master node and a plurality of slave nodes that are included in a distributed server cluster such that nodes of the plurality of nodes deployed in a same physical location belong to a same group, wherein the plurality of groups comprises a first group comprising at least said master node, a plurality of second groups each comprising at least two of the plurality of slave nodes but not comprising said master node, and a third group comprising at least one of the plurality of slave nodes but not comprising said master node;

receiving, by the master node in the distributed server cluster, a data write request, the data write request comprising to-be-written data;

broadcasting, by the master node, the data write request to each of the plurality of groups in the distributed server cluster; and sending, by the master node, a notification message of successful writing to a client sending the data write request, in response to receiving confirmation messages of successfully writing the to-b-written data in memory fed back from more than a half of the plurality of groups;

wherein, for the first group comprising the master node, the group feeds back the confirmation message to the master node in response to the master node writing the to-be-written data to a memory successfully;

wherein, each of the plurality of second groups not comprising said master node and the third group not comprising said master node feeds back the confirmation message to the master node in response to at least one node in respective group writing the to-be-written data to a memory successfully.

* * * * *